(12) United States Patent
Mo et al.

(10) Patent No.: US 9,342,974 B2
(45) Date of Patent: May 17, 2016

(54) AUTONOMOUS AGGREGATED SEARCH PLATFORM AND METHODS USING THE SAME

(75) Inventors: Stanley Mo, Portland, OR (US); Mubashir A. Mian, Morton Grove, IL (US); Rita H. Wouhaybi, Portland, OR (US); Tobias M. Kohlenberg, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/997,198

(22) PCT Filed: Apr. 13, 2012

(86) PCT No.: PCT/US2012/033642
§ 371 (c)(1),
(2), (4) Date: Mar. 26, 2014

(87) PCT Pub. No.: WO2013/154588
PCT Pub. Date: Oct. 17, 2013

(65) Prior Publication Data
US 2014/0197948 A1 Jul. 17, 2014

(51) Int. Cl.
*G08B 1/08* (2006.01)
*G08B 21/24* (2006.01)
(Continued)

(52) U.S. Cl.
CPC ............. *G08B 21/24* (2013.01); *G01S 13/74* (2013.01); *H04W 4/021* (2013.01); *H04W 4/027* (2013.01); *H04W 64/00* (2013.01)

(58) Field of Classification Search
CPC ............. G06K 2017/0045; G08B 13/19608; G08B 21/0202

USPC ................. 340/539.13, 539.15, 572.1–572.9, 340/686.1, 10.1, 13.26; 455/456.1
See application file for complete search history.

(56) References Cited

U.S. PATENT DOCUMENTS 6,118,789 A * 9/2000 Wood, Jr. .................. 370/462
7,155,238 B2 * 12/2006 Katz ...................... 455/456.1
(Continued)

FOREIGN PATENT DOCUMENTS

EP 1441235 A2 7/2004
EP 2 088 750 A1 8/2009
(Continued)

OTHER PUBLICATIONS

Office Action and Search Report received for Taiwan Patent Application No. 102112685, mailed on Nov. 12, 2014, 13 pages of English Translation and 13 pages of Taiwan Office Action.
(Continued)

*Primary Examiner* — Phung Nguyen
(74) *Attorney, Agent, or Firm* — Grossman, Tucker, Perreault & Pfleger, PLLC

(57) ABSTRACT

Systems and methods for searching for lost moving objects such as children are disclosed. In some embodiments, the systems and methods initiate an autonomous, expanding electronic search by emitting a search activation signal from a search initiation device. The search activation signal may include the target tag identifier of a target tag conveyed by the moving object. Search devices detecting the target tag may generate a hit signal, which may be used to determine the location of the target tag. In some instances, focused human searching for the moving object may be initiated based on this determined location, and/or on location information included in one or more hit signals.

23 Claims, 5 Drawing Sheets

(51) Int. Cl.
*H04W 64/00* (2009.01)
*G01S 13/74* (2006.01)
*H04W 4/02* (2009.01)

(56) References Cited

U.S. PATENT DOCUMENTS

| | | | |
|---|---|---|---|
| 8,254,956 B2 * | 8/2012 | Lohi | 455/456.1 |
| 8,284,045 B2 * | 10/2012 | Twitchell, Jr. | 340/539.1 |
| 8,942,719 B1 | 1/2015 | Hyde et al. | |
| 2003/0210142 A1 * | 11/2003 | Freathy et al. | 340/539.13 |
| 2004/0246129 A1 | 12/2004 | Goggin | |
| 2005/0079873 A1 | 4/2005 | Caspi et al. | |
| 2007/0120698 A1 | 5/2007 | Turk et al. | |
| 2010/0102953 A1 | 4/2010 | Chou et al. | |
| 2010/0114488 A1 | 5/2010 | Khamharn et al. | |
| 2011/0143778 A1 | 6/2011 | Hwang et al. | |

FOREIGN PATENT DOCUMENTS

| | | |
|---|---|---|
| JP | 09138269 A | 5/1997 |
| JP | 2006053047 A | 2/2006 |
| JP | 2011029920 A | 2/2011 |
| WO | 2013/154588 A1 | 10/2013 |

OTHER PUBLICATIONS

Frank, et al., "A Service Architecture for Monitoring Physical Objects Using Mobile Phones" Proceedings of the 7th International Workshop on Applications and Services in Wireless Networks, ASWN, 2007, 8 pages.

Yap, et al., "MAX: HumanCentric Search of the Physical World", in Proceedings of the 3rd International Conference on Embedded Networked Sensor Systems (SENSYS ' 05), Nov. 2005, 14 pages.

International Preliminary Report on Patentability and Written Opinion received for PCT Patent Application No. PCT/US2012/033642, mailed on Oct. 23, 2014, 8 pages.

International Search Report and Written Opinion received for PCT Application No. PCT/US2012/033642, mailed on Dec. 26, 2012, 11 Pages.

International Search Report and Written Opinion received for PCT Patent Application No. PCT/US2012/026333, mailed on Jan. 21, 2013, 10 pages.

International Preliminary report on Patentability received for PCT Application No. PCT/US2012/026333, mailed on Sep. 4, 2014, 7 pages.

Office Action received for Japanese Application No. 2014-558718, mailed on Aug. 11, 2015, 4 pages of English translation and 3 pages of Japanese Office Action.

Office Action received for Taiwan Patent Application No. 102112685, mailed on Sep. 21, 2015, 8 pages of English translation and 10 pages of Taiwan Office Action.

Office Action received for U.S. Appl. No. 13/997,936, mailed on Jun. 19, 2015.

* cited by examiner

AUTONOMOUS AGGREGATED SEARCH PLATFORM AND METHODS USING THE SAME

FIELD

The present disclosure relates to search platforms and methods for locating moving objects including, for example, search platforms and methods for locating a lost child, pet, and/or stolen object.

BACKGROUND

Many types of electronic child protection systems exist. Such systems often use a global positioning system (GPS), a single GPS marker which may be attached to the child, and a single active communications device (tracker), such as a smartphone or GPS tracking system. When a child goes missing, he or she may be located using a GPS signal from the marker, provided the signal can be detected.

Several traditional systems have also been developed for locating missing persons. One example of such a system is the well-known America's Missing Broadcast Emergency Response Alert ("Amber alert") wherein law enforcement leverages a community of persons to look for a missing child. Generally, Amber alerts involve transmitting details of the missing child, e.g., via television and/or radio, to a plurality of individuals. Individuals receiving this information are asked to look for the missing child and report back to law enforcement with any information they might have.

While existing child protection systems are useful in many environments, they have several limitations. For example, known electronic child protection systems generally rely on a single tracker attached to the child that is designed with GPS and communications systems to locate, track, and report the child's location back to a parent or some other central monitoring service. If the tracker loses power, is unable to establish communication with GPS and/or communication system, and/or is detached from the child, the electronic search system may not be able to perform its function. Thus, the effectiveness of existing electronic search systems may be neutralized by a single point of failure in the system. Moreover, such systems may be of limited usefulness indoors, because the walls and ceiling of a building can interfere with the transmission and reception of a GPS signal.

Traditional search systems such as the Amber alert may not suffer from the technological limitations of known electronic systems, and may address the single point of failure issue by leveraging the eyes and ears of many individuals to search for a lost child (or other moving object). However, traditional search systems are generally only effective if they are initiated based on accurate and timely information regarding the whereabouts and/or appearance of the lost child. If a traditional search is initiated based on out-of-date information, the likelihood that it will successfully locate the missing child may dramatically decrease. This issue is compounded by the fact that the last known location of a missing child is often not updated (or only infrequently updated) as a traditional search is performed. As a result, even if a traditional search is initiated in an area where the child is located, the child may move (or be moved) out of that location while the search is in progress. Participants in the search may not become aware of the child's movement out of the search area until a significant time later. During this time, the search participants may continue to fruitlessly search in an initial search area, while the child they are seeking may be moving away from them. Traditional searches may also rely on line of sight to locate and identify a lost child. If the search participants do not see the child, the search may fail even if it is conducted in a location where the child is located.

Electronic systems have also been developed for locating lost pets and or stolen objects. Such systems may rely on the same technology as the electronic child protection systems described above, and thus may have the same limitations. Pet identification systems utilizing radio frequency identification (RFID) tags are also known. Although useful REID pet identification systems may require a pet to be captured before it can be identified, e.g., by scanning the RFID tag with an appropriate device held in close proximity to the pet. As a result, existing RFID tagging systems may not be useful for determining the location of a lost pet prior to its capture.

BRIEF DESCRIPTION OF THE DRAWINGS

Features and advantages of embodiments of the claimed subject matter will become apparent from the following detailed description and the drawings, wherein like numerals depict like parts, and in which:

DETAILED DESCRIPTION

Figure 1A:
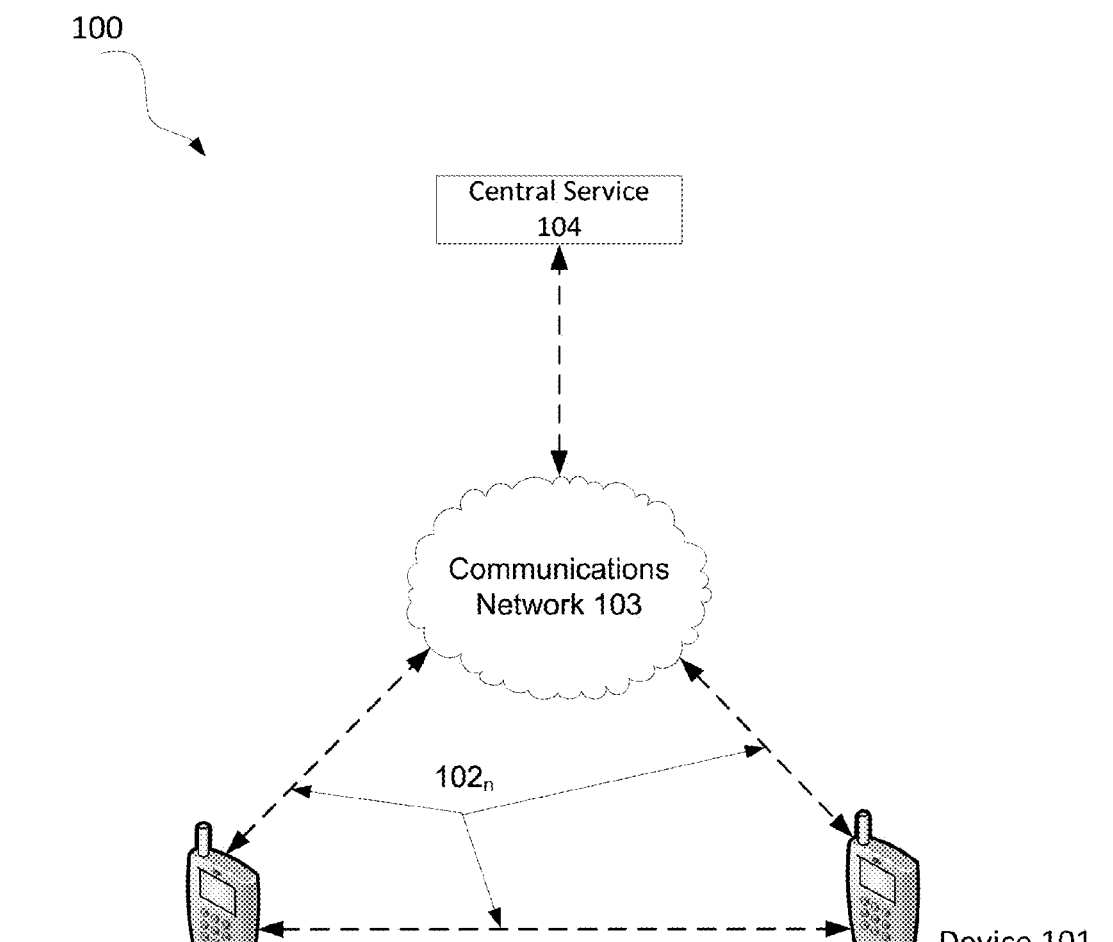
FIGS. 1A and 1B illustrate an exemplary search system in accordance with the present disclosure.

As used herein, the term "autonomous, expanding electronic search" means a search conducted by one or more search devices (as defined below), wherein the geographic scope of the search expands without human interaction. As will be described below, an autonomous, expanding electronic search may be initiated with a first search activation signal, and rapidly expanded without human interaction by transmitting additional search activation signals between respective search devices.

As used herein, the terms, "communications network," and "communications networks" are interchangeably used to refer to one or more systems and/or methods for sending and/or receiving a data signal. These terms encompass close range communication and long range communication, as defined below.

"Close range communication" is used herein to refer to systems and methods for wirelessly sending/receiving data signals between devices that are relatively close to one another. Close range communication includes, for example, communication between devices using a BLUETOOTH™ network, a personal area network (PAN), near field communication, ZigBee networks, combinations thereof, and the like. Close range communication may therefore be understood as direct communication between devices, without the need for intervening hardware/systems such as routers, cell towers, internet service providers, and the like.

The terms "device" and "devices" are used herein to individually and collectively refer to any of the large number of electronic devices that may communicate using a communications network and which may be leveraged as a "search device" (as defined below) in accordance with the present disclosure. Non-limiting examples of devices that may be used in accordance with the present disclosure include automated teller machines, automobiles, automobile navigation systems, clothing, copiers, cell phones, desktop computers, displays (televisions, monitors, projection screens, digital signage, and the like), electronic readers, facsimile machines, game consoles, internet access points (e.g., WIFI hot spots), kiosks, netbook computers, notebook computers, internet devices, ornamental objects (e.g., jewelry), payment terminals, personal digital assistants, media players and/or recorders, printers, public computer terminals, security cameras, set-top boxes, smart phones, tablet personal computers, traffic cameras, traffic monitoring strips, ultra-mobile personal computers, wired telephones, wireless routers, combinations thereof, and the like. Such devices may be portable or stationary.

The term, "moving object," is used herein to individually or collectively refer to any of a wide variety of objects that are or can be in motion, i.e., whose location change(s) or may change over time. Non-limiting examples of moving objects include persons (e.g., children), animals (e.g., pets such as dogs, cats, and the like), personal articles (e.g., purses, wallets, watches, etc.), combinations thereof, and the like. For the sake of illustration, the present disclosure frequently utilizes a lost child as an exemplary moving object that may be located by the systems and methods described herein. As a practical matter, however, the systems and methods of the present disclosure may be used to locate any type of moving (or even static) object.

"Long range communication" is used herein to refer to systems and methods for wirelessly sending/receiving data signals between devices that are a significant distance away from one another. Long range communication includes, for example, communication between devices using a WiFi network, a wide area network (WAN) (including but not limited to a cell phone network (3G, 4G, etc. and the like), the internet, a global positioning system (GPS), a combination thereof, and the like. Long range communication may therefore be understood as communication between devices that occurs with the use of intervening hardware/systems such as routers, cell towers, internet service providers, and the like.

The terms "search device" and "search devices" are interchangeably used herein to refer to one or more devices (as defined above) that are permitted, enabled, or otherwise configured to autonomously search for one or more tags, e.g., using one or more communications networks.

The term, "tag" is used herein to refer to any of a variety of devices that are capable of being associated with a moving (or static) object, and which may be wirelessly detected by one or more search devices. In this context, "associated" means that a tag may be attached, carried, implanted, or otherwise conveyed by, on, and/or within a moving (or static) object. The tags described herein may be active, passive, or a combination thereof. Active tags can independently emit a signal that is capable of being detected by a search device. In contrast, passive tags can reflect an incoming signal from a search device and/or emit a detectable signal in response to receiving a signal from one or more search devices. Non-limiting examples of active tags include BLUETOOTH™ transmitters, WAN/WiFi beacons, GPS transmitters, and other devices that are capable of independently transmitting a signal over a communication network. Non-limiting examples of passive tags include tags that can reflect a signal or use an incoming signal (e.g. a microwave or radio frequency signal) to capacitively store and discharge energy into a circuit that broadcasts another signal in response, e.g., a light, radio, or audible signal. Such tags may include, for example, one or more radio frequency identification (RFID's) and/or other devices that can reflect or otherwise transmit a signal in response to receiving a signal from one or more search devices.

A tag in accordance with the present disclosure may store or otherwise include a unique tag identifier. The tag identifier may include, for example, a unique identification number, electronic signaling protocol, electronic key, chromatic pattern, audio signal, other unique identification indicia, combinations thereof, and the like. In some embodiments, the tags described herein may transmit their tag identifier independently or in response to a signal received from a search device.

The term "target tag" is used herein to denote a tag that is the subject of a search. Generally, the target tags described herein are tags having tag identifier that matches a tag identifier in a search activation signal.

In the FIGS., a subscript "1" and a subscript "n" are used distinguish between search devices that initiate an electronic search (e.g., device $101_1$), and search devices that perform various search functions consistent with the present disclosure (e.g., search device $101_n$). When used, it should be understood that the subscript n is a non-zero integer. Therefore, n may equal 1, 2, 3, 4 . . . 100 . . . 1000 . . . 10000 . . . or more, including all positive integer values above, below, and/or between the aforementioned numbers. Thus for example, the expression "element $X_n$" should be interpreted as indicating that one or a plurality element X's can be present. Therefore while the present disclosure may refer to an element in the singular, e.g., element $X_n$, such expressions should be interpreted as also encompassing the plural form.

Application of a subscript "1" in the FIGS. to identify a search device that initiates a search is arbitrary and for the sake of illustration only. In general, any search device described herein may initiate a search and/or perform search functions consistent with the present disclosure. Moreover, when a central service is used, the central service itself may initiate or otherwise facilitate a search.

For the sake of clarity and simplicity, exemplary systems in accordance with the present disclosure have been illustrated in the FIGS. as including two search devices (e.g., search devices $101_1$ and $101_n$ in FIG. 1A). It should be understood that such illustrations are exemplary only, and that any number of search devices may be used. Indeed, the present disclosure envisions systems in which tens, hundreds, thousands, hundreds of thousands, or more search devices are used (i.e., where n is 1, 5, 10, 100, 1000, 10,000, 100,000 or more, including all values and ranges there between).

The present disclosure relates to autonomous aggregated search systems and methods for using the same. In some embodiments, the systems and methods described herein leverage and marry the natural social networking and common cause nature of traditional searches with technology that allows individuals to actively participate in a search for a moving object, even if they are unaware of the need to search. As will be described later, the disclosed systems and methods may allow an electronic search to originate in one location and rapidly expand to, hopefully, overtake and identify the position of a lost moving object (e.g., a lost child/person). The systems and methods described herein may also facilitate human/animal searching for a moving object.

Systems in accordance with the present disclosure will now be described. For the sake of this discussion, it is assumed that one or more tags have been associated with a moving object and/or an object in the moving objects possession. For example, one or more tags may be fastened to the moving object, integrated into or otherwise attached to clothing, toys, and/or accessories that are worn or conveyed by the moving object, subdermally implanted in the moving object, incorporated into a device carried by the moving object, combinations thereof, and the like. While not necessary, multiple tags may be associated with the same moving object.

The systems of the present disclosure generally include a central service and a plurality of search devices. When a moving object is lost, the central service and/or one of the search devices may initiate a search by emitting a search activation signal that causes one or more of the plurality of search devices to enter an active state and "look" for a target tag attached to the lost moving object. If a search device activated in this manner does not detect the target tag, it may emit its own search activation signal to activate other search devices within its communication range. This process may repeat, with each activated search device "looking" for the target tag and emitting a search activation signal if the target tag is not detected. In this way, the systems described herein can autonomously and rapidly expand the scope of the search until at least one search device detects the tag.

When a search device detects the target tag, it may report a "hit signal" back to the device that initiated the search, and/or to a central service. Using information in the hit signal, the systems described herein can triangulate or otherwise determine the position of the lost moving object. In some instances, the systems may use this information to initiate human/animal searching in the vicinity of the determined location. The system may also track the position and movement of the moving object by periodically or continuously monitoring for the target tag.

FIG. 1A depicts an exemplary search system 100 in accordance with the present disclosure. As shown, search system 100 includes a plurality of search devices $101_1$, $101_n$, communications network 102, and central service 103. Search devices $101_1$, $101_n$ may be any device that is permitted, enabled, or otherwise configured to autonomously search for one or more target tags by looking for tag identifiers identified in a search activation signal. While FIG. 1A depicts search devices $101_1$ and $101_n$ as smart phones, any device capable of acting as a search device may be used. In some embodiments, search devices $101_1$, $101_n$ include mobile devices that are a capable of acting as a search device, such as cell phones, personal data assistants, smart phones, digital cameras, and the like. In additional embodiments, search devices $101_1$, $101_n$ include immobile search devices, such as surveillance/traffic cameras, traffic detection strips, cell phone towers, radio towers, wireless access points, combinations thereof, and the like. Of course, search devices $101_1$, $101_n$ may include a combination of mobile and immobile search devices. As will be described in detail later with reference to FIG. 1B, each search device $101_1$, $101_n$ may have a search module stored therein, which when executed by a processor allows it to perform search operations consistent with the present disclosure.

In system 100, search device $101_1$ may initiate an electronic search by sending one or more search activation signals (SAS) to devices $101_n$ and or central service 103. The SAS may contain the tag identifier of the target tag. The SAS may also contain supplemental information about the missing moving object with which the target tag is associated. In the case of a missing child, for example, supplemental information may include the child's last known location, a physical description of the child, a photograph of the child, a combination thereof, and the like.

Search device $101_1$ may utilize its communication resources to broadcast a SAS over long range communication, short range communication, or a combination thereof. In instances where search device $101_1$ is capable of short range communication, it may transmit a SAS using its short range communication resources to nearby search devices $101_n$. Thus, for example, search device $101_1$ may transmit a SAS using near field communication, a personal area network, BLUETOOTH™ and the like, provided it has the capability to do so. Similarly, if search device $101_1$ is capable of long range communication, it may broadcast a SAS via its long range communication resources to communications network 102, which may relay the SAS to search devices $101_n$. Thus, for example, search device $101_1$ may transmit a SAS to a cell phone network, a wireless network, etc., if it has the capability to do so. Alternatively or additionally, search device $101_1$ may also communicate a SAS to central service 103, which may oversea and direct the initiation and/or performance of an electronic search by all of the search devices participating in system 100. For example, central service 103 may, in response to receiving an SAS from device $101_1$, direct and coordinate the distribution of a corresponding search activation signals to appropriate devices $101_n$, e.g., via communications network 102.

In any case, search device $101_n$ may, upon receiving a SAS, enter an "active" state, during which time it may search for the target tag. For example, search device $101_n$ may "listen" for signals from active tags within its communication range. Alternatively or additionally, search device $101_n$ may emit signals using its communication resources (e.g., via short range communication) that are designed to cause a passive tag to reflect or transmit a signal that includes its tag identifier. In any case, search device $101_n$ may analyze the received signals (from the active/passive tags), and determine whether any of the received signals contain a tag identifier matching the tag identifier provided in the SAS.

If a search device $101_n$ does not detect the target tag, it may emit another SAS containing the tag identifier (included in the SAS received from search device $101_1$ and/or central service 103) using its communication resources. Search device $101_n$ may transmit its SAS in the same or different manner as the initial SAS was transmitted by search device $101_1$ and/or central service 103. That is, search device $101_n$ may transmit a SAS using short range communication, long range communication, or a combination thereof. In this way, a search device $101_n$ that does not detect the target tag can send an SAS to other search devices within its communication range, thereby activating such search devices and causing them to search for the target tag.

Alternatively or additionally, a search device $101_n$ that fails to detect the target tag may record and report its location, time, and/or and results (e.g., no "hit") to central service 103. In instances where a search device $101_n$ has video/photographic capability, the search device may also record video/photographic information at the time of its search, and send such information to central service 103. In this way, the systems and methods of the present disclosure may establish a record of a search that may be useful, e.g., for law enforcement authorities.

The location and results information provided by search devices that do not detect the target tag may be used by central service 103 to coordinate or enhance the search. For example, central service 103 may use this information (which may be received from a plurality of search devices $101_{1,n}$) to determine another geographic location to search for the target tag, and transmit one or more additional search activation signals to search devices in that different geographic location. These additional search devices may, in response to receiving the SAS, enter an active state, look for the target tag, and report their findings (hit or no hit) to central service 103. This "search and report" process may repeat until one or more search devices $101_n$ detect the target tag. For clarity, a search device that detects the target tag is called a "detecting search device."

When a detecting search device detects the target tag, it may automatically record its location at the time of detection. The detecting search device may also attempt to transmit a "hit signal" containing information about its location to central service 103 and/or device $101_1$. For example, when the detecting search device has a connection to a communications network at the time of detection, it may use that network to transmit the hit signal back to device $101_1$ and/or central service 103. The location information may be, for example, GPS coordinates (if the detecting search device is GPS capable), a cell tower location (if the detecting search device is connected to a cellular network), other location information, combinations thereof, and the like. Where the detecting search device has video and/or photographic capability, the hit signal may further include video, photographs, and the like that were recorded by the detecting search device at the time such device looked for the target tag and, in particular, at the time the detecting search device detected the target tag.

If the detecting search device does not have a connection to a communications network at the time of detection, it may attempt to transmit a hit signal (e.g., via close range communication) to/through other search devices within its communication range. Such other search devices may repeat the hit signal using their communication signals. This process may repeat until a hit signal reaches a search device that has a connection to communications network 102. In this way, the systems and methods of the present disclosure may allow information in a hit signal from a detecting search device to be to be transmitted to search device $101_1$ and/or central service 103, even if the detecting search device does not have a connection to communications network 102. When a search device having a connection to communication network 102 receives information in the hit signal, it may transmit that information to device $101_1$ and or central service 103 via communications network 102.

A detecting search device may also transmit a search activation signal containing the tag identifier of the target tag to additional search devices within its communication range. Upon receiving this SAS, such additional search devices may, if they are not already participating in the search, enter an active state and search for the target tag. Because the additional search devices are within the communications range of a detecting search device, it is likely that they too will detect the target tag. If so, those additional search devices (now additional detecting search devices) may automatically record information about their location at the time of detection. The additional detecting search devices may also attempt to transmit a hit signal containing their location back to central service 103 and/or device $101_1$, thereby strengthening the reliability of the hit signal initially conveyed by a first detecting search device. This process may continue until the target tag is detected (e.g, surrounded) by multiple detecting search devices.

At this time, device $101_1$ and/or central service 103 may use the location information provided by the multiple detecting search devices to triangulate or otherwise determine the relative position of the target tag. As may be appreciated, the accuracy of the determined location may increase as the number of detecting search devices increases.

Devices $101_n$ may be configured to periodically monitor for the presence of the target tag during the execution of a search. For example, a device $101_n$ activated by a search signal may initially not detect the presence of the target tag, and may itself emit a search activation signal including the tag identifier of the target tag to search devices within its communication range. Search device $101_n$ may then continue to search for the target tag, either continuously or periodically. In the latter case (periodic monitoring), search device $101_n$ may enter a passive state during which the target tag is not searched for, and later enter an active state, during which time it again searches for the target tag.

Similarly, detecting search devices may continuously or periodically monitor for the presence of the target tag until a deactivation signal is received. If a detecting search device no longer detects a previously detected target tag it may emit search activation signals that cause search devices within its communication range to search for the target tag. In this way, the systems and methods of the present disclosure can not only detect the position of a target tag, but can also identify and determine the target tag's movement, trajectory, and/or speed. Such period monitoring may also permit search devices participating in a search to detect a target tag in the event that it later moves into its communication/detection range.

Figure 1B:
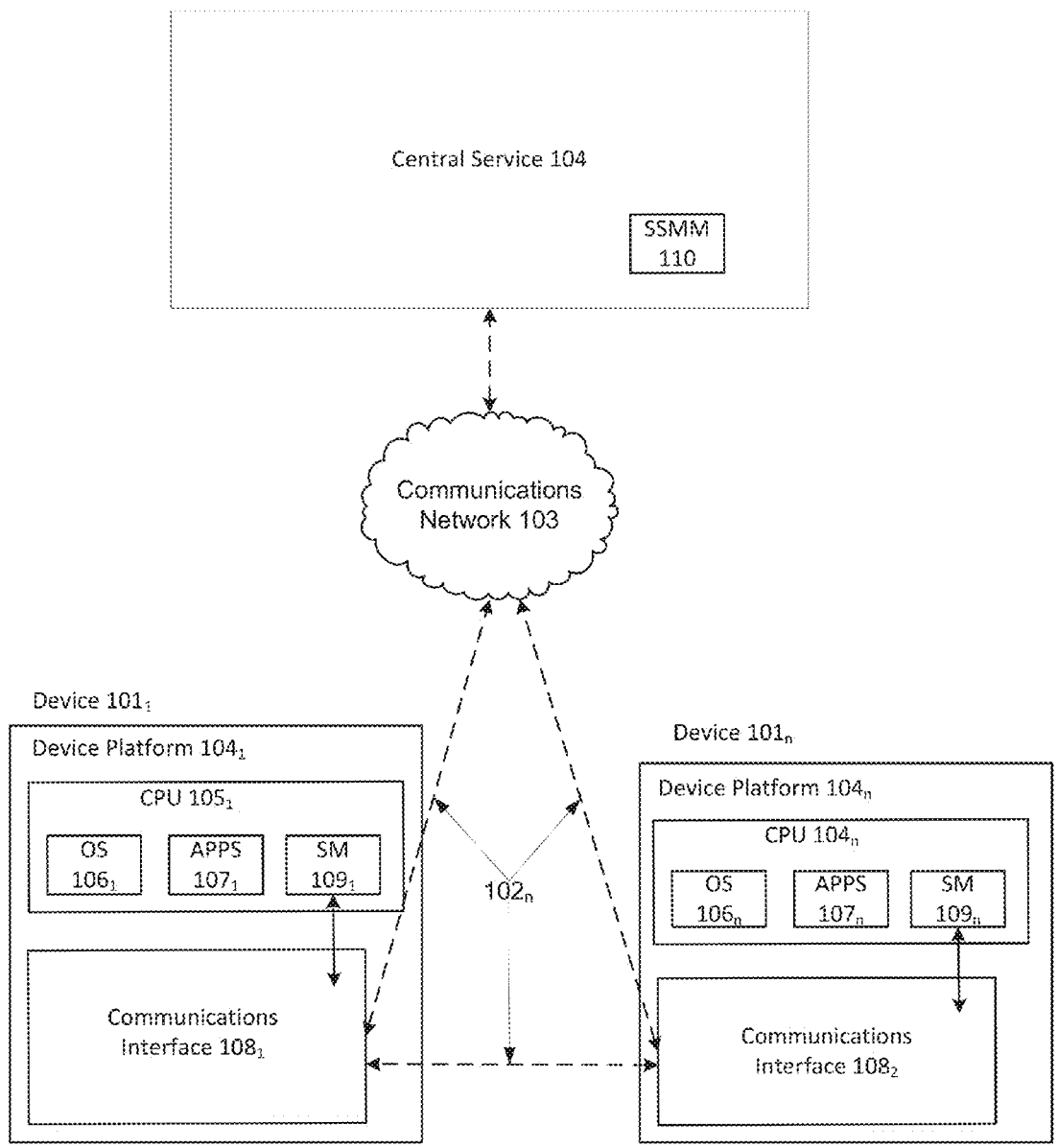

FIG. 1B further illustrates search system 100. As shown, search device $101_1$ includes device platform $104_1$. For the purpose of this example, search device $101_1$ is illustrated in FIG. 1A as a smart phone and thus, device platform $104_1$ may correlate to a smart phone platform. However, it should be understood that device platform $104_1$ may take another form. Indeed, device platform $104_1$ may be an appropriate platform for any of the search devices described above.

Device platform $104_1$ includes processor (CPU) $105_1$. Without limitation, CPU $105_1$ may execute software, such as operating system (OS) $106_1$ and applications (APPS) $107_1$. Device platform $104_1$ may also include chipset circuitry (not shown). Such chipset circuitry may include integrated circuit chips, such as but not limited to integrated circuit chips commercially available from Intel Corporation. Of course, other types of integrated circuit chops any also be used. It is noted that the term "circuitry," as used in any embodiment herein may comprise, singly or in combination, hardwired circuitry, programmable circuitry, state machine circuitry, and/or firmware that stores instructions executed by programmable circuitry.

Device platform $104_1$ may further include communications interface $108_1$. Communications interface $108_1$ may include hardware (e.g., circuitry), software, or a combination of hardware and software that allows search device $101_1$ to send and receive a search activation signal (SAS) over one or more communications networks, e.g., using a predefined communications protocol. For example, communications interface $108_1$ may include one or more transponders, antennas, BLUETOOTH™ chips, personal area network chips, combinations thereof, and the like. In this way, communications interface $108_1$ can allow search device $101_1$ to send and receive search activation signals via close range communication, via long range communication, or a combination thereof. In some embodiments, communications interface $108_1$ is configured to allow search device $101_1$ to send and receive data signals via both close range communication and long range communication.

Search device $101_1$ may further include search module (SM) $109_1$. As may be appreciated, SM $109_1$ may take the form of instructions stored in a computer readable medium, which when executed by a processor (e.g., CPU $105_1$) cause the processor (and/or the corresponding search device) to perform search operations consistent with the present disclosure. Examples of computer readable media that may be used to store SM $109_1$ include but are not limited to the following types of memory: semiconductor firmware memory, programmable memory, non-volatile memory, read only memory, electrically programmable memory, random access memory, flash memory (which may include, for example NAND or NOR type memory structures), magnetic disk memory, optical disk memory, combinations thereof, and the like. Additionally or alternatively, computer readable media may include other and/or later-developed types of computer readable memory.

For the purpose of clarity, search device $101_n$ is illustrated in FIG. 1B as including the same components as search device $101_1$. Indeed, search device $101_n$ includes device platform $104_n$, a processor (CPU) $105_n$ executing OS $106_n$ and APPS $107_n$, and communications interface $108_n$. The nature and function of these components is the same as the description of the corresponding components included in device $101_1$ described above. Thus, the functional description of the elements of search device $101_1$ above should be understood as equally applying to the components of search device $101_n$. Of course, search devices $101_1$ and $101_n$ need not have the same configuration. Indeed, any type of search device (as defined above) may be utilized as search device $101_1$ and/or search device $101_n$, provided that it is capable of sending/receiving a search activation signal and detecting a target tag, i.e., as acting as a search device.

SM $109_1$ and SM $109_n$ can provide a mechanism for initiating and conducting an autonomous, expanding electronic search for a target tag with search devices $101_1$ and $101_n$. This can allow search devices $101_1$ and $101_n$ to become active participants in a search, even when their users/owners are unaware of the need to search. While these components are described below as performing distinct functions, i.e., search initiation (SM $109_1$) vs. search performance (SM $109_n$), it should be understood that SM $109_1$ and SM $109_n$ may be capable of performing each other's activities. Thus, SM $109_1$ and SM $109_n$ may each cause their respective search devices to perform search initiation functions and search performance functions consistent with the present disclosure.

SM $109_1$ and/or $109_n$ may take the form of one of one or more applications that are executed by processors $105_1$, $105_n$ of device platforms $104_1$ and $104_n$, respectively. In this regard, SM $109_1$ and/or SM $109_n$ may be provided (by an original equipment manufacturer or otherwise) as a preinstalled application on a device. Alternatively or additionally, SM $109_1$ and/or $109_n$ may be downloaded (e.g., from central service 103) and installed on search devices $101_1$ and/or $101_n$ as standalone applications. Moreover, SM $109_1$ and/or $109_n$ may be hardcoded into the circuitry of devices $101_1$, $101_n$. For example, SM $109_1$ and/or $109_n$ may be programmed into a field programmable gate array (FPGA), developed as an application specific integrated circuit (ASIC), applied as firmware code in a device, and/or programmed into a secondary processor, such as a graphics processing unit.

SM $109_1$ and SM $109_n$ may be executed by their respective processors in the foreground and/or background (e.g., as a background service) of OS $106_1$, $106_n$, respectively. In any case, SM $109_1$ and/or SM $109_n$ may when executed cause their respective search devices to monitor tier an input and/or search activation signal that initiates the performance of an electronic search for a target tag. Prior to the receipt of such an input/signal, SM $109_1$ and SM $109_n$ may be considered as being in a "passive" state. Upon receiving an input/signal triggering the initiation or performance of an electronic search, SM $109_1$ and/or SM $109_n$ may enter an "active" state, wherein they may cause their respective devices to perform one or more search functions consistent with the present disclosure.

In this regard, SM $109_1$ may when executed by a processor may cause search device $101_1$ to initiate an electronic search for a target tag associated with a moving object, such as a lost child. In one mode of operation, SM $109_1$ may initiate an electronic search in response to an input made by a user of search device $101_1$. Such inputs may be made, for example, through a graphical user interface (GUI) provided by SM $109_1$ when it is executed by processor $105_1$. In addition to providing an interface to receive inputs for initiating an electronic search, the GUI may also function to permit the input of a tag identifier, a description/image of the lost moving object, last known location information, and the like. In any case, SM $109_1$ in this mode of operation may cause search device $101_1$ to emit a search activation signal (SAS) using its communications interface $108_1$.

In the event that communications interface $108_1$ is capable of multiple modes of communication (e.g., near field communication, wireless network communication, cellular network communication, etc.), SM $109_1$ may cause search device $101_1$ to transmit the search signal using one or a combination of such modes. In instances where a SAS is transmitted by search device $101_1$ using close range communication, nearby search devices $101_n$ may receive the SAS directly from search device $101_1$. This concept is illustrated by the broken line connecting device $101_1$ and $101_n$ in FIG. 1B. Alternatively or additionally, SM $109_1$ may cause search device $101_1$ to communicate a SAS to communications network 102, which may then relay or broadcast the SAS over a wide area. This concept is illustrated in FIG. 1B by the broken line connecting device $101_1$ to communications network 102, and the broken line connecting communications network 102 and device $101_n$. In this way, device $101_1$ may communicate a SAS to devices $101_n$ that may not be reached via close range communication. For example, communicating a SAS via communications network 102 may also allow search device $101_1$ to communicate with one or more search devices $101_n$, in the event that such devices are incapable of receiving or interpreting search signals transmitted by device $101_1$ in another manner, such as the close range communications modalities described above.

In another mode of operation, SM $109_1$ when executed may cause search device $101_1$ to initiate a search by communicating with central service 103. For example, SM $109_1$ may, upon receipt of an input from a user or otherwise, cause device $101_1$ to communicate a search request to central service 103. Central service 103 may then generate an appropriate search activation signal and transmit such signal using the communications resources available to it. As may be appreciated, central service 103 may have access to greater number of communications resources than device $101_1$ and thus, may transmit an SAS over a larger area than device $101_1$.

In yet another mode of operation, SM $109_1$ when executed may cause search device $101_1$ to initiate an electronic search by emitting a search activation signal via communications interface $108_1$, and transmitting a search request to central service 103. As this mode combines the functions of the first two modes described above, the operations of search device $101_1$ in this mode are not reiterated.

SM $109_n$ when executed by processor $105_n$ may cause search device $101_n$ to monitor for a user input and/or search activation signal that initiates an electronic search for a target tag. In the former case, SM $109_n$ may provide a mechanism, such as a graphical user interface, through which a user may manually input a tag identifier into SM $109_n$. Alternatively or additionally, SM $109_n$ may cause search device $101_n$ to listen for search activation signals (from search device $101_1$, central service 103, or the like) that include a tag identifier. In any case, when search device $101_n$ receives a tag identifier (whether through a user input, a SAS, or otherwise), SM $109_n$ may cause search device $101_n$ to enter an active state and search for tags within its within its communication range. For example, SM $109_n$ may cause device $101_n$ to listen for signals from active tags, to emit signals that cause passive tags to reflect or transmit a signal containing their tag identifier, or a combination thereof. In any case, SM $109_n$ may further cause search device $101_n$ to analyze any signals received from active/passive tags, and analyze such signals for the tag identifier provided by the user input/SAS, i.e., the target tag's tag identifier.

If a search device $101_n$ does not detect a signal containing the target tag identifier, it may communicate the target tag identifier (e.g., in one or more additional SAS) to additional search devices within its communication range. This may occur immediately when search device $101_n$ does not detect a signal containing the target tag identifier, or after a delay. In the latter case, the delay may be chosen so as to provide search device $101_n$ with a reasonable amount of time to detect the target tag before relaying the SAS. For example, devices $101_n$ may be configured to relay an SAS after failing to detect the target tag for about 0.5 seconds, about 1 second, about 5 seconds, about 10 seconds, about 30 seconds, about one minute, or even about 5 minutes. Of course, such delay times are exemplary only, and delay times shorter, longer, and within the foregoing time frames may be used.

If a search device $101_n$ detects a signal containing the target tag identifier, SM $109_n$ may cause the detecting search device to automatically record information relevant to the detection. For example SM $109_n$ may cause the detecting search device to record the time of detection, its location, the strength of the signal received from the target tag, other information, combinations thereof, and the like. SM $109_n$ may then cause the detecting search device to attempt to transmit a "hit signal" containing all or a part of this information to search device $101_1$ and/or central service 103. As previously described the detecting search device may attempt to relay the hit signal device $101_1$ and/or central service 103 through communications network 102, other search devices $101_n$, or a combination thereof.

SM $109_n$ when executed may further cause a detecting search device to communicate the target tag identifier to additional search devices within its communication range. As explained previously, this may cause additional search devices to detect the target tag and report a hit signal to device $101_1$ and/or central service 103. In this way, reliability of the detection of the target tag may be improved. Moreover, if multiple search devices $101_n$ detect the target tag and report a hit signal to device $101_1$ and/or central service 103, the location for at least an approximate location) of the target tag may be triangulated or otherwise determined. As may be appreciated, the precision and/or accuracy of the determined target tag location may increase as the number of detecting search devices increases.

SM $109_n$ when executed may also permit search devices $101_n$ to receive additional data signals from central service 103 and/or device $101_1$. In some embodiments, for example, central service 103 and/or device $101_1$ may receive a hit signal from one or more detecting search devices. In such instances, central service 103 and/or device $101_1$ may issue one or more deactivation signals to devices that are not in proximity to the target tag, in this way, the systems of the present disclosure can put search devices that are no longer of use into a passive state. Alternatively or additionally, central service 103 and/or device $101_1$ may send signals that place devices that are not in proximity to the target tag into a standby mode, wherein such devices periodically monitor for the target tag at less frequent intervals. As may be appreciated, search devices in standby mode may detect the target tag in the event that it (or the moving object) moves into the communication/detection range of the device.

SM $109_n$ when executed may also cause a detecting search device to play audio and/or visual (A/V) information though an audio/visual interface (e.g., a display) thereof. The A/V information may include a textual or auditory request to search for the missing moving object. In some embodiments, the A/V information may include supplemental information about the missing moving object that was included in the SAS generated by search device $101_1$ and/or central service 103. Alternatively or additionally, the A/V information may include supplemental information about the missing moving object that is separately transmitted to the detecting search devices from search device $101_1$ and/or central service 103, e.g., in response to the receipt of one or more hit signals.

As may be appreciated, the supplemental information may contain a written description of the lost moving object, a picture thereof, the last known location of the missing moving object, the detected position of the missing moving object, combinations thereof, and the like. In the case of a missing child, for example, central service 103 and/or device $101_1$ may send signals to detecting search devices that include a physical description of the child, the child's last known location, a recent picture of the child, combinations thereof, and the like. SM $109_n$ may cause such information to be projected on a display of the detecting search device, along with a textual/auditory request to search for the missing child.

Search device $101_1$ and/or central service 103 may periodically transmit updated target tag location information to the detecting search devices. As noted previously, detecting search devices may periodically or continuously monitor for the presence of the target tag, and report hit signals containing their location information to search device $101_1$ and/or central service 103. Search device $101_1$ and/or central service 103 may use these hit signals to determine the position of the target tag. As the location of the target tag changes, location information provided by detecting search devices may correspondingly change, and may be subsequently used to update the determined location of the target tag. Should the determined location of the target tag change, search device 101 and/or central service may transmit the updated location to the relevant detecting search devices. Central service 103 and/or device 101 may also inform devices previously detecting the tag of the target tag's movement, location, and/or rate of speed.

Central service 103 may be a single machine or a number of machines, which may be co-located or distributed geographically. In operation, central service 103 may perform user setup and search management functions in accordance with the present disclosure. In this regard, central service 103 may have a search service management module ("SSMM") 210 provisioned thereon, which when executed by a processor (not shown) may cause central service 103 to perform search service management functions consistent with the present disclosure. SSMM 110 may be provisioned on a network service, such as but not limited to an internet (cloud) server. Regardless of its location, an SSMM may be implemented as a computer readable medium having instructions stored therein which when executed by a processor cause central service 103 to perform user profile setup and/or search management operations consistent with the present disclosure.

SSMM 110 when executed may provide a mechanism for establishing a database of users that wish to participate in the search systems and methods described herein. For example, SSMM 110 when executed may provide a graphical user interface through which potential users may register or otherwise enter information pertinent to the service. This information may be used by SSMM 110 to establish a user profile that is managed by the central service. The user profile may include standard authentication indicia, such as a user name and password, which may be used by the central service to authenticate a user of the search systems described herein. In addition, the user profile may store tag information for tags associated with a particular user. Thus, through SSMM 110, a user may input tag identifiers (serial number, etc.) for the tags he/she possesses.

In addition to authentication and tag identifiers, the user profile may associate tag information with a particular tag. As previously noted, tag information may include a picture of the object, a physical description, biometric information (e.g., in instances where the object is a person or an animal), combinations thereof, and the like. Accordingly, SSMM 110 may further operate to allow a user to input information bout objects associated with a particular tag or tags. The tag information may be later included supplemental information supplied from the central service to one or more detecting search devices, as previously described.

SSMM 110 may also function to allow owners/users to identify their devices as being available for use by the systems and methods described herein. In this way, individuals wishing to allow their devices to participate in electronic searches can volunteer their devices for use with the systems and methods described herein. In the event that a search module is not provisioned on a particular device, the central service may also provide a download service through which a search module compatible with a particular device may be obtained.

SSMM 110 when executed may also cause the central service to perform search management functions consistent with the present disclosure. For example, SSMM 110 may cause the central service to monitor for search requests from search devices (e.g., search device $101_1$ in FIG. 1A) and relay search activation signals to one or more additional search devices. In some embodiments, SSMM 110 causes the central service to transmit a search activation signals to all or part of the registered search devices maintained in its databases. Alternatively or additionally, SSMM 110 may cause the central service to transmit search devices to registered search devices based on information provided in the search request. For example, when a search request includes last known location information for a lost moving object bearing a tag, SSMM 110 may cause the central service to transmit a SAS to registered search devices located in proximity to the last known location.

As a search is conducted, SSMM 110 may cause central service 103 to monitor for hit signals from one or more detecting search devices. Upon receiving a hit signal, the SSMM may attempt to triangulate or otherwise determine the position of the target tag. Alternatively or additionally, the SSMM may cause the central service to transmit search activation signals to registered search devices in proximity to a detecting search device. In this way, the SSMM and central service may further enhance the number of detecting search devices, and hence, the reliability of the hit detection and/or determined target tag position.

SSMM 110 may also, upon receiving a hit signal, send signals to search devices relatively close to a detecting search device into a heightened awareness mode. In this mode, search devices in proximity to a detecting search device (but which do not detect the target tag) may actively monitor for the target tag either continuously or at a periodic (but elevated) rate. In other words, the SSMM may attempt to surround detecting search devices with search devices operating in a heightened awareness mode. As may be appreciated, search devices operating in a heightened awareness mode may continue to diligently monitor for the target tag, even if the target tag is not presently detected. If the target tag moves into their detection range, search devices operating in a heightened awareness mode may be able to quickly detect the target tag, and report a hit signal to the central service/SSMM. The SSMM may continuously update the number and position of search devices in the heightened awareness mode, as the determined target tag position changes.

By monitoring the location information in the hit signals and the rate at which that information changes, SSMM 110 may determine the direction of movement and/or speed of the tag, as it changes, SSMM 110 may also periodically transmit the updated location and movement information to search devices in proximity to the target tag, along with other supplemental information, as discussed above. Finally, SSMM 110 may marshal a human search by sending one or more human search requests to detecting search devices and/or search devices in proximity to a detecting search device.

Figure 2:
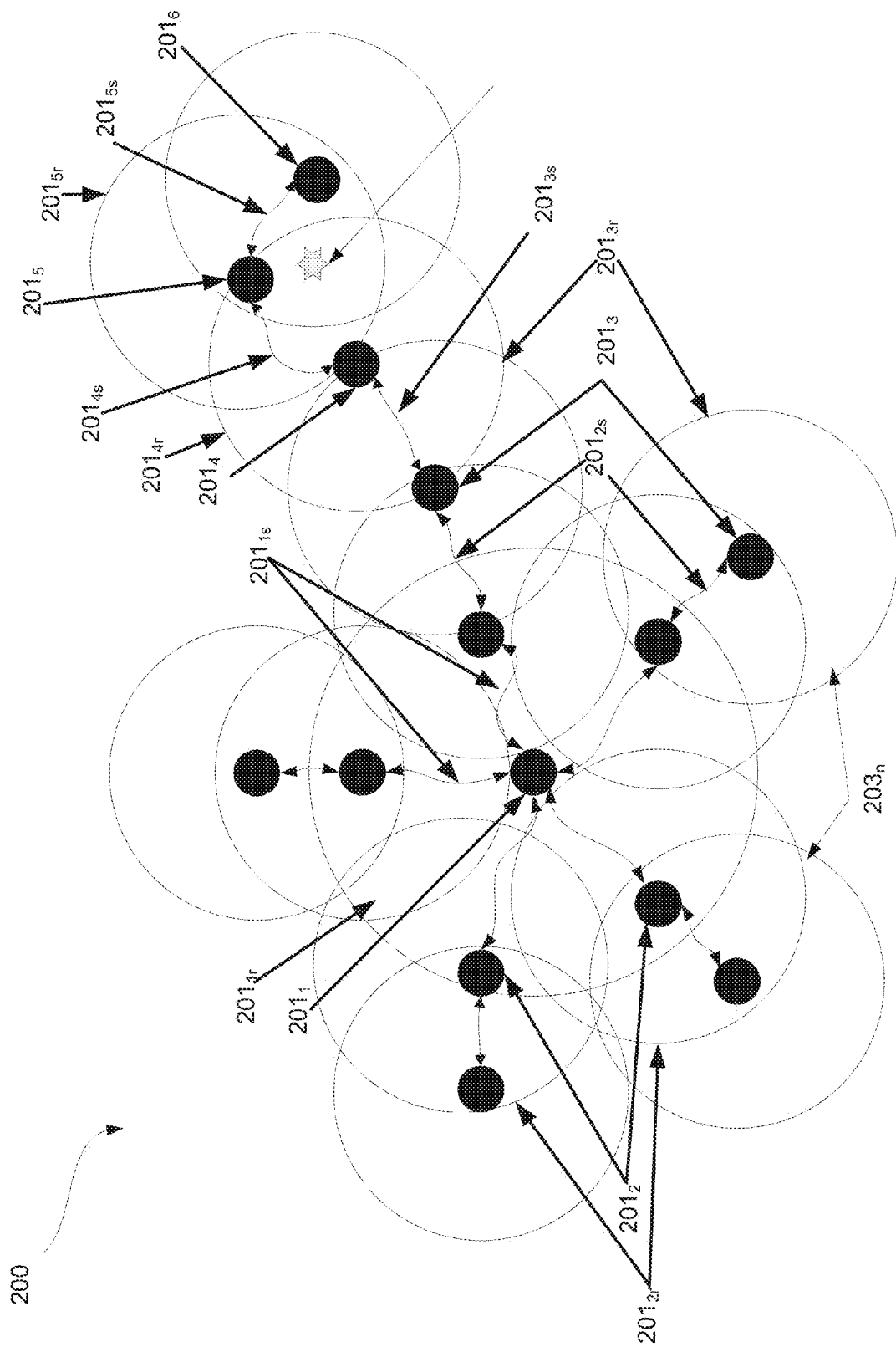
FIG. 2 illustrates an exemplary autonomous expanding search conducted by a system in accordance with the present disclosure.

As a non-limiting illustration of an electronic search that may be conducted with the systems and methods of the present disclosure, reference is made to FIG. 2. In this example, an electronic search for tag 204 is initiated by a search module provisioned on search device $201_1$. Here, the search module on search device $201_1$ causes it to emit search activation signals $201_{1s}$ to devices ($201_2$) within its communication range $201_{1r}$. SAS $201_{1s}$ includes the tag identifier for tag 204. As will also be described in detail below, search devices $201_2$ (and subsequent search devices $201_3$, $201_4$, etc.) may also have a search module executed thereon, which when executed causes them to perform one or more functions consistent with the present disclosure.

As may be appreciated, the size of communication range $201_{1r}$ may depend on the communication resources that are available to search device $201_1$. For example, if search device $201_1$ is connected to a communications network such as a cellular telephone network, communications range $201_{1r}$ may be quite large. Similarly, if search device $201_1$ has a data connection with a central service (not shown), it may convey a search request (not shown) containing the relevant tag identifier to the central service. The central service may then transmit search activation signals corresponding to the SAS $201_{1s}$ over a wide area. Search device $201_1$ may also transmit one or more search signals $201_{1s}$ using close range communication resources available to it, e.g., via near field communication, BLUETOOTH™, and the like. In this way, search device $201_1$ may still initiate a search, even if it is not connected to a communication network.

In this particular example, SAS $201_{1s}$ may be received by search devices $201_2$, which are located within communication range $201_{1r}$ of search device $201_1$. In response to receiving SAS $201_{1s}$, search devices $201_2$ may enter an active state, and may utilize their resources to search for tag 204 within their respective communication ranges $201_{2r}$ (shown as circles surrounding devices $201_2$). As explained above, search devices $201_2$ may monitor for an active signal transmitted by tag 204, and/or emit signals designed to reflect off of tag 204 and/or which cause tag 204 to emit a signal containing its tag information.

In this example, tag 204 is not located within communication range $201_{2r}$ of search devices $201_2$. As a result, search devices $201_2$ may each transmit their own search activation signal(s) (shown as signals $201_{2s}$) containing the tag identifier for tag 204 to search devices within their respective communication range(s) $201_{2r}$. Search devices $201_2$ may then go into a passive state, or they may continuously/periodically search for tag 204. Search devices 201$_2$ may also relay their location and/or search results (e.g., no hit) to a central service, which may then relay a SAS to other search devices.

Search devices 201$_3$ within communication range 201$_{2r}$ may receive search activation signals 201$_{2s}$ from search devices 201$_2$. In response to receiving search activation signals 201$_{2s}$, search devices 201$_3$ may enter an active state, and search for tag 204. In this particular example, tag 204 is outside communication range 201$_{3r}$ of search devices 201$_3$ and so is not detected by such devices. Search devices 201$_3$ may therefore each transmit their own search activation signal (shown as signals 201$_{3s}$) within their respective communications range(s) 201$_{3r}$. Like the other search devices, search devices 201$_{3r}$ may at this time enter a passive state, and/or continuous/periodically search for tag 204.

Search device 201$_4$ may receive search activation signals 201$_{3s}$ enter an active state, and search for tag 204. Because tag 204 is within its communication range 201$_{4r}$, it may be detected by search device 201$_4$. Upon detecting tag 204, search device 201$_4$ may communicate a "hit signal" back to search device 201$_1$ and/or to a central service (not shown). The hit signal may contain information about the location of search device 201$_4$, information regarding the detection of tag 204 (strength of signal, proximity, etc.), the size of communication range 201$_{4r}$, other relevant information, combinations thereof, and the like. As described previously, the hit signal may be communicated to device 201$_1$ or a central service via a communications network, by broadcasting and retransmission through a plurality of search devices, e.g., using close range communication, or a combination thereof.

In addition to transmitting a hit signal, search device 201$_4$ may itself emit search activation signals in an attempt to cause one or more additional search devices to detect tag 204. This concept is illustrated in FIG. 2, wherein search device 201$_4$ emits search activation signals 201$_{4s}$ within its communication range 201$_{4r}$. Signals 201$_{4s}$ may be received by search device 201$_5$, which may then search for tag 204 within its communication range 201$_{5r}$. Upon detecting tag 204, device 201$_5$ may return a hit signal back to device 201$_1$ and/or a central service. This process may continue in an attempt to further increase the number of devices detecting tag 204. Indeed, as shown in FIG. 2, search device 201$_5$ may itself emit search activation signals 201$_{5s}$, which are received by and activate search device 201$_6$, causing it to search for and detect tag 204 with communication range 201$_6$. Because multiple devices (in this case, search devices 201$_4$, 201$_5$, and 201$_6$) detect tag 204, and report hit signals back to device 201$_1$ and/or a central service, the accuracy and reliability of the information contained in such hit signals may increase, which may improve the ability to accurately determine the location of tag 204.

As illustrated in FIG. 2, the systems and methods of the present disclosure can leverage a plurality of search devices to perform an autonomous expanding electronic search. The area searched by such devices may rapidly and successively expand away from an initial search device as individual search devices emit search activation signals that activate other search devices within their respective communications range. In this way, the search initiated by a first search device may rapidly and successively expand to additional search devices. As may be appreciated, this can allow the systems of the present disclosure to search a wide area for a target tag in a much faster manner than can be attained with a conventional search.

Figure 3:
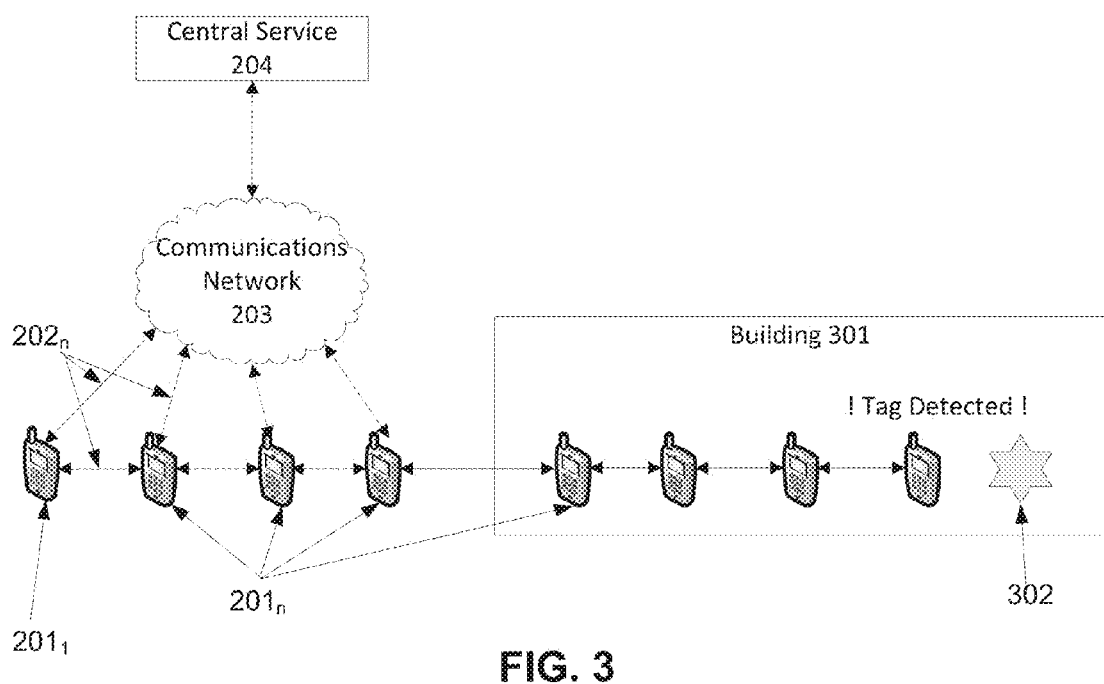
FIG. 3. illustrates another exemplary autonomous expanding search conducted by a system in accordance with the present disclosure.

The ability of the search devices to autonomously perform an expanding electronic search is illustrated in FIG. 3, which depicts another exemplary search system in accordance with the present disclosure. In this example, search device 201$_1$ initiates (e.g., through a search module provisioned thereon) an electronic search for tag 302 by emitting a search activation signal and/or a search request to central service 204. When search device 201$_1$ emits a SAS using close range communication, the SAS may be received by other search devices (e.g., search devices 201$_n$ within its communication range. Alternatively or additionally, a search activation signal may be sent through communication network 203 and/or central service 204, as previously described. This concept is illustrated by hashed lines 202, between devices 201$_1$, 201$_n$, and communications network 203.

In this particular example, devices 201$_n$ respond to the search activation signal by entering an active state and searching for tag 302. When a search device 201$_n$ fails to detect tag 302, it may expand the search by transmitting a search activation signal containing the tag information of tag 302 to devices within its communication range. This concept is illustrated by the hashed lines connected devices 201$_n$, either directly or through communications network 203. The search may successively expand in this manner until tag 302 is detected, whereupon the detecting search device(s) may act in the manner previously described.

Because a search activation signal may be sent via close range communication, devices 201$_1$ and 201$_n$ can expand and conduct an electronic search for tag 302, even when a connection to communication network 203 is unavailable or cannot be established. This concept is illustrated in FIG. 3, wherein a search is extended into building 301, wherein a connection to communication network 203 is unavailable. Devices 201$_n$ within building 301 may continue to expand the search within building 201$_n$ by transmitting search signals via close range communication or another mechanism (e.g., via a network established by one or more internet hotspots within building 301) to other search devices within communication range.

When a search device 201$_n$ in building 301 detects tag 302, it/nay attempt to transmit a hit signal back to search device 201$_1$ and/or central service 204. In this non-limiting example, however, the detecting search device is within building 301, and cannot establish a connection to communication network 203. As a result, the detecting search device may not be able to directly communicate a hit signal to device 201$_1$ and or central service 204. To address this issue, the detecting search device may transmit a hit signal via close range communication to other search devices within its communication range. Other search devices receiving the hit signal from the detecting search device may relay or otherwise transmit information in the hit signal to other search devices within their communications range. When a search device having a connection to communication network 203 receives the hit signal, it may transmit the hit signal to device 201$_1$ and/or central service 204, e.g., using communications network 203.

In this way, the search devices described herein may expand into and conduct a search in an interior location, even when a connection to a communications network is not available. The search devices may also transmit information in a hit signal generated by a detecting search device out of such a location, and eventually relay the hit signal to device 201$_1$ and/or central service 204 when a connection to a communications network may be established. Thus, search devices having a connection to a communications network may act as a proxy for sending hit signals generated by detecting search devices that do not have a connection to such a network.

As noted briefly above, supplemental information may be communicated or provided from/to detecting search devices.

E.g., upon detecting a tag, a search module executed on a detecting search device may cause supplemental information about the missing moving object to appear on a display thereof. In the case of a missing child, for example, a search module executed on a detecting search device may cause an image and/or description of the child to appear on its display. Such information may be accompanied by textual information, such as a request for the user of the device to look for the missing child. This information may have been included in a search activation signal received by the detecting search device, or in another data signal (e.g., from a central service) that was sent in response to a hit signal generated by the detecting search device. In this way, the systems and methods of the present disclosure may initiate a highly focused search similar to an Amber alert, which may be aided by the electronic detection of the tag by the search devices. This can enable owners/users of the search devices to become active participants in the search, and to efficiently search even if they do not have line of sight to the child/tag.

The systems and methods of the present disclosure can further enhance human searching for a lost moving object by updating the location of a target tag associated with the moving object after the target tag is initially detected. A search module on a device may cause this updated location information to be displayed or otherwise conveyed by a search device. In instances where the updated location information is provided on a display of a search device, the displayed information may be accompanied by a directional indicator to "point" the user of the search device towards the target tag's location. If the system detects that the target tag has moved out of the initial area, it may send updated information to the devices that previously detected the target tag. For example, the system may notify human searchers via one or more search devices of the movement of the target tag out of the initial search area. The system may then inform such searchers of the target tag's updated location, movement direction, and/or velocity.

The systems and methods of the present disclosure may also be integrated with audio, visual, and image recognition systems. That is, while the present disclosure has focused on the use of cell phones and smart phones as search devices, other devices may also be used in the systems described herein. In this regard, it is noted that many video devices (e.g., surveillance cameras, traffic camera, web devices, etc.) are capable of wired and/or wireless communication. In some embodiments, the systems and methods of the present disclosure may interface with or otherwise leverage such surveillance devices to further enhance the capabilities of the systems and methods described herein.

By way of example, the systems and methods of the present disclosure may include one or more video devices such as surveillance cameras that are capable of serving as search devices, as described above. That is, like devices $101_1$, $101_n$ in FIGS. 1A and 1B, such video devices may be capable of sending and receiving signals via close range communication and/or long range communication. Moreover, such devices may be capable of storing and executing a search module that allows them to perform search functions consistent with the present disclosure. Thus for example, such devices may enter an active state upon receipt of one or more search activation signals, at which time they may search for tags with the tag identifier conveyed in the search signal. As they search for the tag, such video devices may continuously or periodically record audio, visual, and/or audio visual information (e.g., sounds, pictures, video, etc.). In some instances, the video devices may transmit such information back to the device originating the search and/or to a central service. In either case, the audio/video information may be accompanied by identifying information, such as a time stamp and/or location information identifying the time and/or location at which the audio/visual information was recorded.

In this way, the video devices described herein may establish a record of the environment around the video device at the time a search is being conducted. Such video information may be useful to law enforcement or another authority seeking to investigate the circumstances surrounding the disappearance of the missing moving object. For example, law enforcement may be able to use the video record generated by the video devices described herein in their investigation of a crime such as theft, kidnapping, and the like.

The systems of the present disclosure may also be configured to analyze audio and/or video information recorded by the video devices described above. For example, the systems described herein may execute one or more facial or image recognition routines on video information recorded by the video devices of the present disclosure. In this way, the video devices may be leveraged to perform image/video based searching for the missing moving object. Such search routines may be conducted based on information about the missing moving object provided to the system, e.g., via an initial search request/signal.

Figure 4:
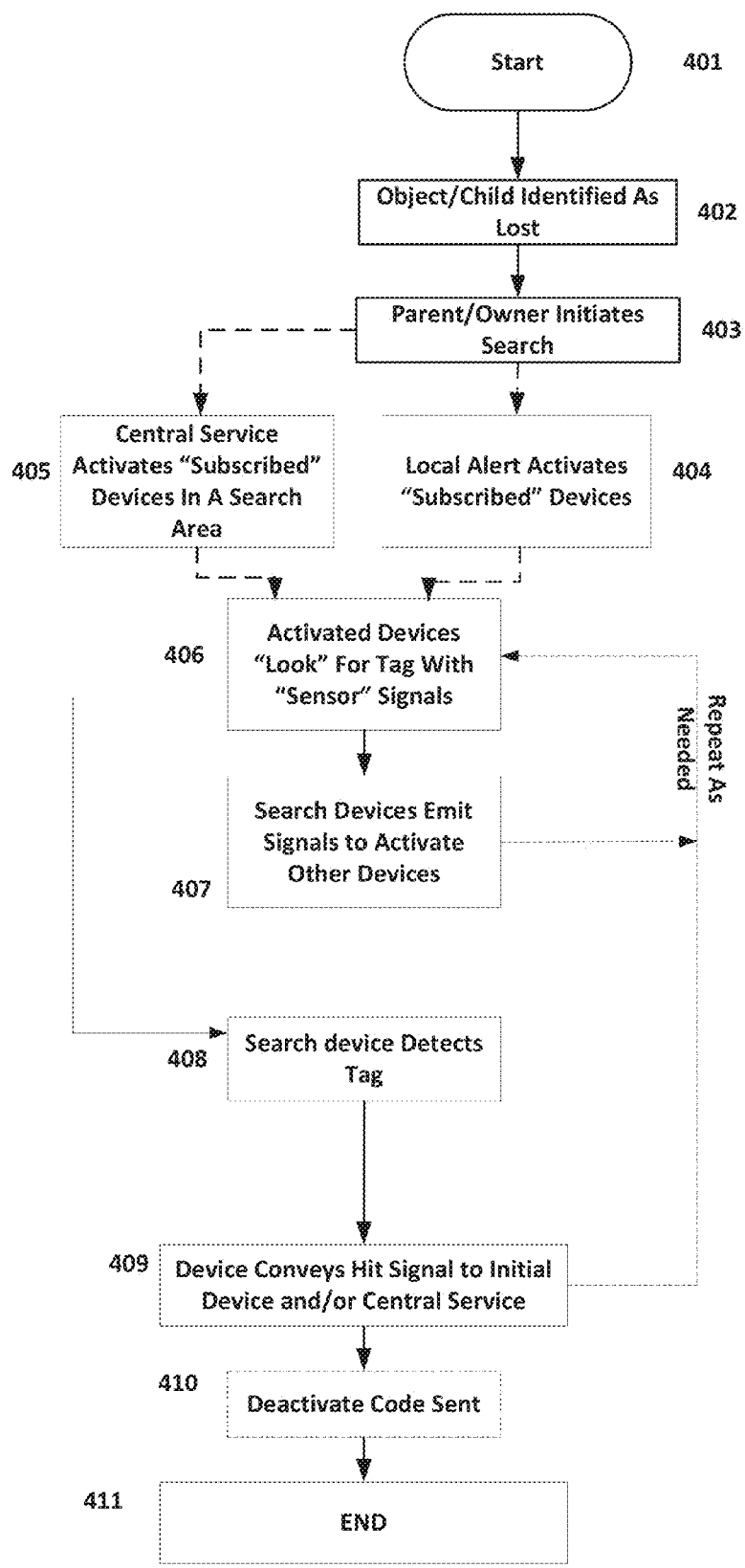
FIG. 4 is a flowchart of an exemplary method in accordance with the present disclosure.

Another aspect of the present disclosure relates to methods for initiating and conducting an electronic search. In this regard, reference is made to FIG. 4, which depicts a flow diagram of an exemplary method in accordance with the present disclosure. For the sake of clarity, the following discussion of FIG. 4 assumes that one or more tags have been attached or otherwise associated with the missing moving object under consideration, e.g., a child, a wallet, etc. It also assumes the availability of a plurality of search devices, e.g., devices that are registered with a central service and which have a search module stored therein.

As shown, the method begins at block 401. At block 402, an object or child may be identified as lost. For example, a parent may notice that his/her child is missing, or an owner may notice that his/her wallet has been stolen. At this time, the process may proceed to block 403, wherein the parent/owner may initiate a search. The parent/owner may initiate the search using a search module provided on his/her device (e.g., by making one or more inputs to a search module executed on his/her device), and/or by contacting a relevant central service. In any case, the parent/owner may identify the tag(s) associated with the missing moving object.

At this time, the process may proceed to blocks 404 and/or 405. In block 404, the parent/owner initiates a search by providing one or more inputs to a search module executed on his or her device. The search module causes the device to transmit one or more search activation signals containing relevant tag identifier using close and/or long range communication to other search devices within range. At block 405, a search is initiated by a central service, which generates an appropriate search activation signal and transmits it to appropriate search devices (e.g., search devices in proximity to the parent/owner). Consistent with the foregoing discussion, it should be understood that either or both of blocks 404 and 405 may be executed to initiate an electronic search, and that execution of such blocks need not occur at the same time. The process may then continue to block 406.

At block 406, search devices receiving a search activation signal may enter an active state and "took" for the target tag, in the manner previously explained in connection with the system. If the target tag is detected, the method proceeds to block 408. Otherwise, the method proceeds to block 407, wherein search devices can emit search activation signals that cause other search devices within communication range to enter an active state and search for the target tag. Blocks 406 and 407 may repeat as necessary, expanding the search to additional search devices until the target tag is detected (block 408).

At block 409, a detecting search device may transmit a hit signal to the search originating device and/or a central service. The hit signal may contain information regarding the detecting search devices location, detection range, etc., as previously described. The search originating device and/or central service may use this information to triangulate or otherwise determine the position of the target tag.

At optional block 410, the search originating device and/or central service may send a deactivation code/signal to one or more search devices. The deactivation code may be sent, for example, in response to an indication that the target tag has been found, or that the search has been called off. Alternatively or additionally, the deactivation code may be sent to devices that are not in proximity to a detecting search device. In this way, the methods of the present disclosure may be able to lower or minimize wasteful use of resources, by deactivating search devices that are not in proximity to a detected target tag, or by placing such devices into a passive or standby mode.

At block 411, the method ends.

Accordingly, one embodiment of the present disclosure relates to a system for searching for a moving object. The system can include a first search device. The first search device may include a first processor, a first communications interface configured to communicate using a predefined communications protocol, and a first memory having first search module instructions stored therein. The first search module instructions when executed by the first processor may cause the first communications interface to transmit a first search activation signal with the first communications interface to a second search device within a first communication range of the first search device. The first search activation signal when received by a second search device can cause the second search device to search for a target tag associated with the moving object.

In some embodiments, the second search device includes a second processor, a second communications interface, and a second memory having second search module instructions stored therein. In such embodiments, the first search activation signal when received by said second communications interface can cause the second search device to search for said target tag.

The target tag conveyed by the moving object may be configured to emit at least one target tag signal. The target tag signal comprising a unique target tag identifier. For example, the target tag identifier may include a unique numeric sequence distinguishing the target tag from other tags. In some embodiments, the first search activation signal includes the target tag identifier. In such instances, the second search device can search for the target tag by analyzing tag signals received with said second communications interface for the unique target tag identifier.

The first search activation signal may also cause the second search device to transmit a first hit signal to at least one of the first search device and a central service, if the second search device detects said target tag. The second search device may be considered to have detected the target tag if it detects a tag signal containing the target tag identifier included in the first search activation signal. As may be appreciated from the foregoing discussion, the first hit signal can include information about the second search device at a time the second search device detects said target tag. For example, the first hit signal can include time information, date information, location information, combinations thereof and the like.

In some embodiments, a second search device may fail to detect a target tag. In such instances, the first search activation signal can cause the second search device to transmit a second search activation signal to one or more additional search devices within a second communication range thereof. The second search activation signal may cause one or more additional search devices to search for the target tag. If one or more additional search devices detect said target tag, it/they may transmit a second hit signal to at least one of the first search device and a central service.

In instances where a second search device detects the target tag, the first search activation signal may cause the second search device (a detecting search device) to transmit a second search activation signal to one or more additional search devices within a second communication range thereof. As noted previously, this second search activation signal can cause one or more of the additional search devices to search for the target tag. If one or more of the additional search devices detects the target tag, it may transmit at least one additional hit signal to at least one of the first search device and a central service.

In some embodiments the first search device, the central service, or a combinations thereof may determine the location of the target tag using information in said first hit signal. In instances where additional hit signals are generated, the first search device, the central service, or a combination thereof may determine the location of the target tag from the first hit signal, the additional hit signal(s), or a combination thereof.

The system may include at least one connected search device and at least one disconnected search device. As used herein, the term "connected search device" means a search device that is capable (permanently or temporarily) of long range communication, as defined above. The term, "disconnected search device" is used herein to mean a search device that is incapable (permanently or temporarily) of long range communication. Thus, for example, a connected search device may communicate via one or more cell phone networks, whereas a disconnected search device could not. However, either or both of a connected search device and a disconnected search device may communicate using short range communication, as defined above.

In such instances, the first search activation signal may cause at least one connected search device and at least one disconnected search device to search for said target tag. If a disconnected search device detects the target tag, the first search activation signal may cause the disconnected search device to transmit a hit signal to a connected search device using close range communication. As may be appreciated from the foregoing discussion, information contained in the hit signal generated may be conveyed over a plurality of disconnected search devices (e.g., using short range communication), until it is received by a connected search device. In any case, once a connected search device receives a hit signal (and/or information contained therein) generated by a disconnected search device, the first search activation signal may cause the connected search device to communicate information in said hit signal to at least one of the first search device, a central service, or a combination thereof (e.g., using long range communication).

In further non-limiting embodiments, the present disclosure relates to a system for conducting an electronic search. The system includes a plurality of search devices and a target tag. Each of the plurality of search devices includes a processor, a communications interface, and a memory having search module instructions stored therein. When executed by the processor, said search module instructions causes one or more of said plurality of search devices to: search for the target tag in response to receiving a search activation signal. If the target tag is not detected, the search module instructions when executed may further cause one or more of the search devices to transmit at least one additional search activation signal to additional search devices within a communications range thereof (e.g., of the communications interface). Alternatively, if a search device detects said target tag, the search module instructions when executed by a processor of such device may cause the detecting search device to transmit at least one hit signal.

In some embodiments, the plurality of search devices can search for said target tag by analyzing signals received by said communications interface. If a tag signal containing a target tag identifier is received by the communications interface, the search device may register a "hit" and transmit a hit signal.

The present disclosure also relates to a central service for managing the performance of a search with a plurality of search devices. The central service may include a central service processor and a central service memory having search service management module (SSMM) instructions stored therein. The SSMM instructions when executed by said central service process can cause the central service to receive at least one hit signal from a search device detecting a target tag conveyed by a moving object. The SSMM instructions when executed may further cause said central service to determine a location of the target tag from the at least one hit signal.

A search initiation device may be included in the plurality of search devices. In such instances, the central service may initiate an autonomous, expanding electronic search by transmitting a search activation signal in response to receiving a search request from the search initiation device. This search activation signal may initiate an autonomous, expanding search for a target tag by one or more of the plurality of search devices.

In some embodiments, the SSMM instructions when executed by the central service processor further cause the central service to transmit a supplemental information signal to a search device generating said at least one hit signal. The supplemental information signal may include information about the moving object, additional information by the target tag, combinations thereof, and the like. The supplemental information signal may be transmitted to search devices generating a hit, search devices in proximity to search devices generating a hit, combinations thereof, and the like. In any case, the supplemental information signal when received by a search device may cause the search device to display the supplemental information on a display thereof.

Another aspect of the present disclosure relates to a method for searching for a moving object. The method may include emitting a search activation signal from a search initiation device. The search activation signal may initiate an autonomous, expanding electronic search for a target tag conveyed by said moving object. In some embodiments, the search activation signal causes a plurality of search devices to participate in the autonomous, expanding electronic search.

The method may also include storing a database of registered search devices, where the registered search devices are configured to participate in autonomous, expanding electronic searches. In such instances, the search activation signal may be transmitted to one or more of the registered search devices, e.g., based at least in part on the last known location of the moving object.

The method may also include transmitting at least one additional search signal in response to a hit signal generated by the autonomous, expanding electronic search. The at least one additional search signal may initiate initiates another autonomous, expanding electronic search based on location information contained in said hit signal. The method may also include initiating a human or animal search for said moving object, based on location information contained in said hit signal.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A first mobile device, comprising:
   a processor;
   a communications interface; and
   a search module;
   wherein:
   the search module is configured to initiate an autonomously electronic search for a target tag associated with a moveable object at least in part by transmitting a first search activation signal;
   the first search activation signal is configured to:
   cause a second mobile device to search for the target tag; and
   when the target tag is not detected by the second mobile device, to cause the second mobile device to transmit a second search activation signal, the second search activation signal configured to cause a third mobile device to search for said target tag.

2. The first mobile device of claim 1, wherein said first search activation signal comprises a target tag identifier corresponding to said target tag and is configured to cause said second mobile device to search for said target tag based at least in part by searching for tag signals containing said target tag identifier.

3. The first mobile device of claim 2, wherein said second search activation signal includes said target tag identifier.

4. The first mobile device of claim 2, wherein said first search activation signal further comprises supplemental information, said supplemental information comprising at least a description of the moving object, an image of the moving object, or a combination thereof.

5. The first mobile device of claim 1, wherein said search module is further configured to determine the location of said target tag in response to receipt of a hit signal from said second mobile device, said third mobile device, or another mobile device, said hit signal signifying the detection of said target tag.

6. The first mobile device of claim 5, wherein said search module is further configured to cause said first communications interface to, in response to receiving said hit signal from said second mobile device, said third mobile device, or said other mobile device, transmit a human or animal search request to said second mobile device, said third mobile device, or said other mobile device.

7. The first mobile device of claim 1, wherein said search module is further configured to cause the first mobile device to transmit a search deactivation signal in response to an indication that a search for said target tag is complete.

8. A first mobile device for performing an autonomous electronic search for a tag associated with a moving object, comprising:
   a processor;
   a communications interface; and
   a search module;

wherein the search module is configured to:
cause the first mobile device to perform an autonomously electronic search for a target tag associated with a moveable object in response to receipt of a first search activation signal; and
when the target tag is not detected by the first mobile device, to cause the first mobile device to transmit a second search activation signal, the second search activation signal configured to cause a second mobile device to search for said target tag.

9. The first mobile device of claim 8, wherein:
said first search activation signal comprises a tag identifier corresponding to said target tag; and
said search module is configured to cause said first mobile device to search for said tag based at least in part by searching for tag signals containing said target tag identifier.

10. The first mobile device of claim 8, wherein when said first mobile device detects said tag, said search module is further configured to cause said first mobile device to transmit a hit signal, the hit signal configured to inform at least one other mobile device of the detection of said tag.

11. The first mobile device of claim 10, wherein said hit signal includes information about the location of said device at a time said first mobile device detects said tag.

12. The first mobile device of claim 10, wherein:
when said first mobile device has a connection to a long range communications network, said search module is configure to cause said second communications interface to transmit said hit signal using long range communication; and
when said first mobile device lacks a connection to a long range communications network, said search module is configure to cause said second communications interface to transmit said hit signal using close range communication.

13. The first mobile device of claim 8, wherein said communications interface transmits said first search activation signal using close range communication.

14. A central service for managing the performance of an electronic search for a tag associated with a moving object, comprising:
a processor;
a communications interface; and
a search service management module;
wherein:
the search service management module is configured to initiate an autonomously electronic search for a target tag associated with a moveable object at least in part by transmitting a first search activation signal to a first mobile device;
the first search activation signal is configured to:
cause the first mobile device to search for a the target tag; and
when the target tag is not detected by the first mobile device, to cause the first mobile device to transmit a second search activation signal, the second search activation signal configured to cause a second mobile device to search for said target tag.

15. The central service of claim 14, wherein the search service management module is configured to cause the transmission of said first search activation signal in response to receipt of a first search request for said target tag.

16. The central service of claim 14, wherein in response to receipt of a hit signal signifying the detection of the target tag from at least one mobile device, the search service management module is configured to cause the central service to transmit a supplemental information signal, said supplemental information signal comprising at least a description of the moving object, an image of the moving object, or a combination thereof.

17. The central service of claim 16, wherein said search service management module is further configured to cause said central service to transmit said supplemental information signal to a detecting search device, the detecting search device being a mobile device that generated said hit signal.

18. The central service of claim 17, wherein said search service management module is further configured to transmit said supplemental information signal to mobile devices within a pre-determined distance of a determined location of said tag.

19. A method for searching for a moving object, comprising:
emitting a first search activation signal from a first search device;
wherein the first search activation signal is configured to:
cause a second search device to search for a the target tag; and
when the target tag is not detected by the second search device, to cause the second search device to transmit a second search activation signal, the second search activation signal configured to cause a third search device to search for said target tag; and
wherein the first, second, and third search devices are first, second, and third mobile devices, respectively.

20. The method of claim 19, wherein said first search activation signal comprises a target tag identifier corresponding to said target tag and is configured to cause said second search device to search for said target tag based at least in part by searching for tag signals containing said target tag identifier.

21. The method of claim 19, further comprising:
storing a database of registered search devices, said registered search devices being configured to participate in autonomous, expanding electronic searches;
wherein said first search device comprises one of said registered search devices.

22. The method of claim 21, further comprising selecting said first search device from said database of registered search devices based at least in part on a last known location of said moving object.

23. The method of claim 19, further comprising:
determining, in response to receipt of a hit signal from a search device, a location of a detected tag; and
transmitting an additional search signal to one or more search devices within a predetermined proximity to said detected tag, wherein the additional search signal is configured to cause said one or more search devices to perform another search for said target tag.

* * * * *